(12) United States Patent
Ho

(10) Patent No.: US 7,534,058 B2
(45) Date of Patent: May 19, 2009

(54) LENS CAP MODULE

(75) Inventor: Chin-Hsin Ho, Hsinchu (TW)

(73) Assignee: Altek Corporation, Hsinchu (TW)

( * ) Notice: Subject to any disclaimer, the term of this patent is extended or adjusted under 35 U.S.C. 154(b) by 322 days.

(21) Appl. No.: 11/441,043

(22) Filed: May 26, 2006

(65) Prior Publication Data

US 2007/0274709 A1    Nov. 29, 2007

(51) Int. Cl.
  *G03B 17/00* (2006.01)
  *G03B 9/20* (2006.01)

(52) U.S. Cl. ...................... 396/448; 396/498

(58) Field of Classification Search ............ 396/85–87, 396/269, 132–136, 387, 406, 409, 411, 79, 396/463, 448–451, 493–510, 535, 84, 354, 396/355, 444, 452; 359/227–235, 511
See application file for complete search history.

(56) References Cited

U.S. PATENT DOCUMENTS 4,876,563 A * 10/1989 Ishida et al. ................ 396/448
5,980,121 A * 11/1999 Fujisaki ...................... 396/349
6,220,769 B1 * 4/2001 Hirota et al. ................ 396/411
7,128,480 B2 * 10/2006 Tanaka et al. ............... 396/448

* cited by examiner

*Primary Examiner*—Reena Aurora
(74) *Attorney, Agent, or Firm*—Rosenberg, Klein & Lee

(57) ABSTRACT

A lens cap module is provided and positioned at a holding stand. The lens cap module includes a plurality of leaf pieces, a switch and a gear transmission. The leaf pieces are slidably positioned at the holding stand, and the leaf pieces can come into contact with or separated from one another. The switch is sliadbly positioned at the holding stand, and the gear transmission is positioned between the leaf pieces and the switch. The switch drives the leaf pieces to rotate through the gear transmission. Thus, it saves much more space for the leaf pieces and spends much less time closing or opening the leaf pieces.

8 Claims, 7 Drawing Sheets

LENS CAP MODULE

BACKGROUND OF THE INVENTION

1. Field of the Invention

The present invention relates to a lens cap module, and in particular, to a lens cap module that is implemented to image devices such as mobile phones, cameras, video cameras or projectors and is opened or closed manually or automatically.

2. Description of Related Art

Lens cap module of cameras in the prior art such as Taiwan Patent No. 570,207 (Publication date: Jan. 1, 2004) discloses a camera with a lens cap module. The camera includes a front housing with a hole, a rear housing, housing and a lens cap module. The lens cap module includes a switch, an internal housing, a cap piece, a first connection rod, a second connection rod, a third connection rod and a resilient member. The switch is positioned at one side of the front housing, and the internal housing is positioned at the back side of the front housing and a first hook. The first connection rod is integrally formed with and extends from the cap piece and is pivotally connected with the backside of the front housing. The second connection rod includes a second hook and a first pin and a second pin, and the third connection rod includes a holding portion, a base portion and a guide groove positioned at the base portion. The holding portion is firmly connected with the switch. In addition, the first pin and the second pin are slidably connected with the first connection rod and one end of the guide groove of the base portion. The second connection rod and the third connection rod are positioned between the housing and the internal housing and guided to move. Finally, the resilient member is connected between the second hook of the second connection rod and the first hook of the internal housing.

However, the conventional lens cap module is bulky and needs a larger receiving space because the conventional lens cap module is one-piece member. In addition, the lens cap module utilizes connection rods to open or close the cap piece so that it spends much longer time opening or closing the cap piece. Presently, users need product which is light-weighted, thin, compact or easy-use. The one-piece member is a restriction to design product which is light-weighted, thin, compact or easy-use, and it takes much time to provide new product with users.

Thus, there is a need for a non-directional connector.

SUMMARY OF THE INVENTION

It is an object of the present invention to provide a lens cap module that needs less storage space and less time to open or close.

To achieve the object of the present invention, a lens cap module is provided and positioned at a holding stand. The lens cap module includes a plurality of leaf pieces, a switch and a gear transmission. The leaf pieces are slidably positioned at the holding stand, and the leaf pieces can come into contact with or separated from one another. The switch is sliadbly positioned at the holding stand, and the gear transmission is positioned between the leaf pieces and the switch.

Thus, there is a need for a lens cap module.

BRIEF DESCRIPTION OF THE DRAWINGS

The present invention can be fully understood from the following detailed description and preferred embodiment with reference to the accompanying drawings, in which.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
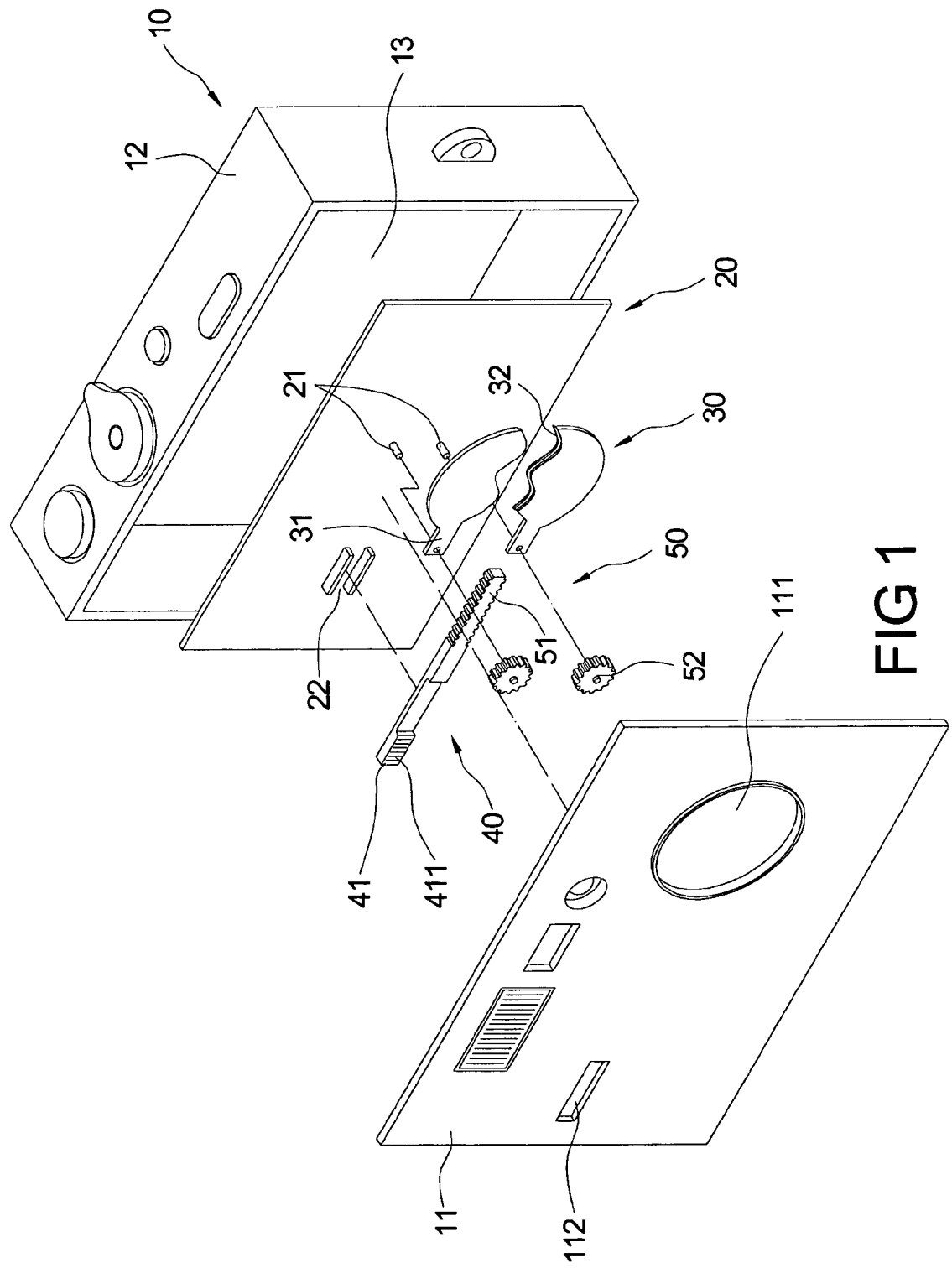
FIG. 1 is an exploded view of a lens cap module according to the first embodiment of the present invention.
Figure 2:
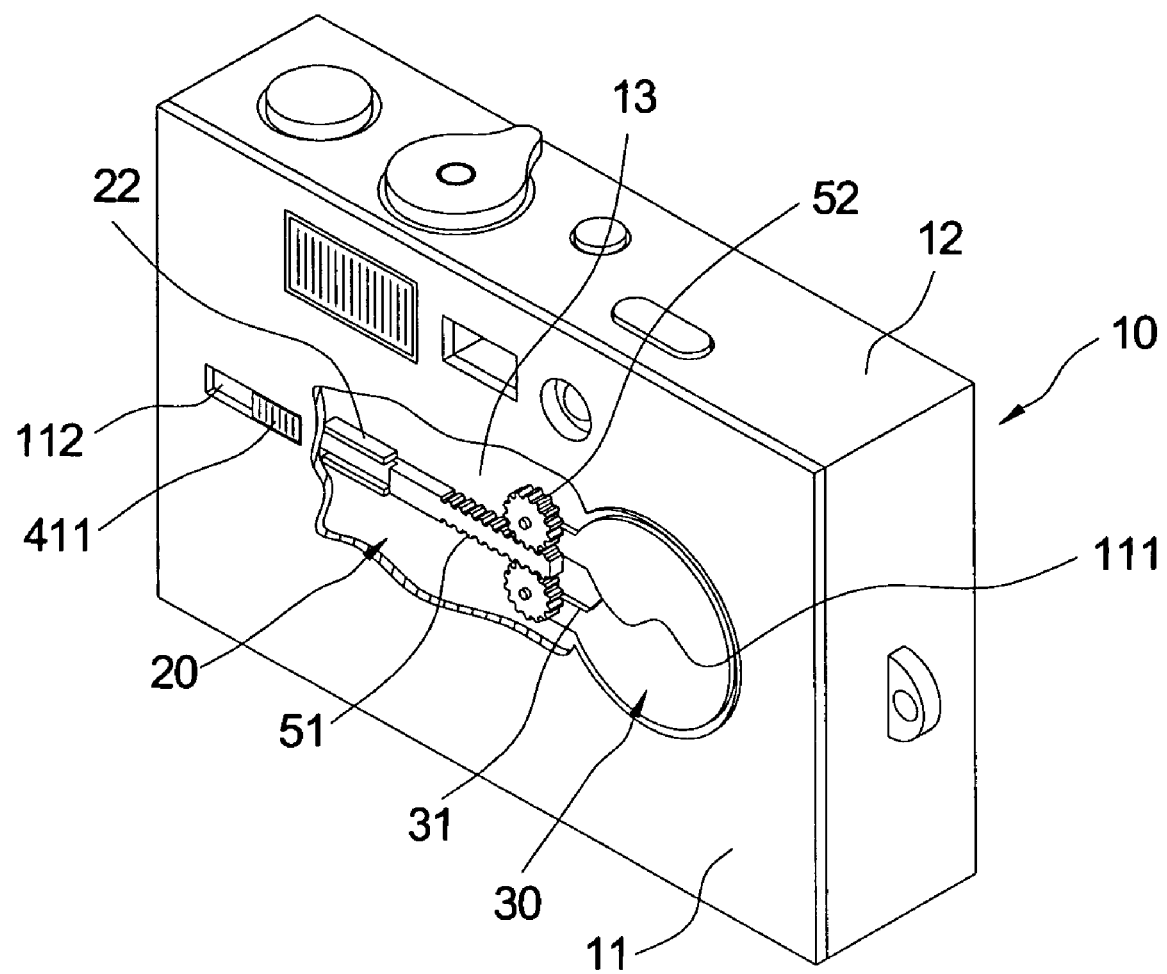
FIG. 2 is a perspective view of a lens cap module according to the first embodiment of the present invention.
Figure 3:
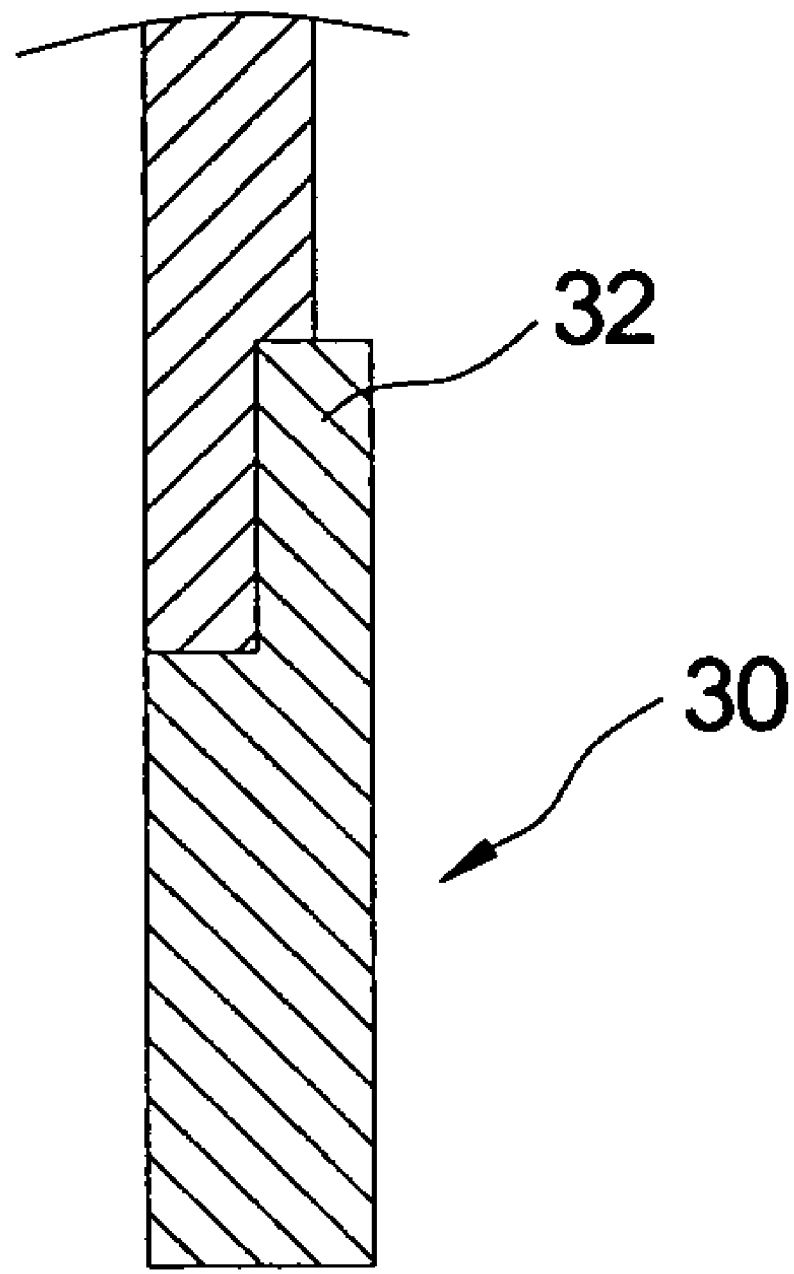
FIG. 3 is a partly cross-sectional view of a lens cap module of the present invention when the leaf pieces are engaged.

Reference is made to FIGS. 1, 2 and 3. According to the present invention, the lens cap module is positioned at the holding stand 20 within a camera 10. The lens cap module includes two leaf pieces 30, a switch 40 and a gear transmission 50. The camera 10 includes a front housing 11 and a rear housing 12. The front housing 11 is combined with the rear housing 12 so that a receiving space 13 is formed. The front housing 11 has a substantially circular hole 111 and a substantially rectangular through hole 112 at its front surface. The holding stand 20 is positioned within the receiving space 13 and has two holding pins 21 and a guide groove 22.

The leaf pieces 30 are substantially semi-circular members, and two extensions 31 are integrally formed and extend from one end of each of leaf pieces 30 respectively. Each of the extensions 30 is pivotally connected with one of the holding pins 21 of the holding stand 20 so that the leaf pieces are rotatably connected with the holding stand 20. The other end of the leaf piece 30 is an engagement portion 32, and two leaf pieces 30 are separately connected to each other through the engagement portion 32. In addition, the leaf pieces 30 abut at the circular hole 111 of the front housing 11.

The switch 40 is slidably positioned at the guide groove 22 of the holding stand 20 and has a drive element 41. The drive element 41 is a hand-push portion 411 and is positioned in vicinity of one end of the switch 40. In addition, the hand-push portion 411 corresponds with the through hole 112 of the front housing 11.

The gear transmission 50 includes a rack 51 and two spur gears 52. The rack 51 is positioned in vicinity of the other end of the switch 40, and the spur gears 52 are firmly positioned on two extension portions 31 of the two leaf pieces 30 respectively. The two spur gears 52 respectively engage with upper teeth and lower teeth so that the gear transmission 50 is movably connected between the two leaf pieces 30 and the switch 40.

Figure 4:
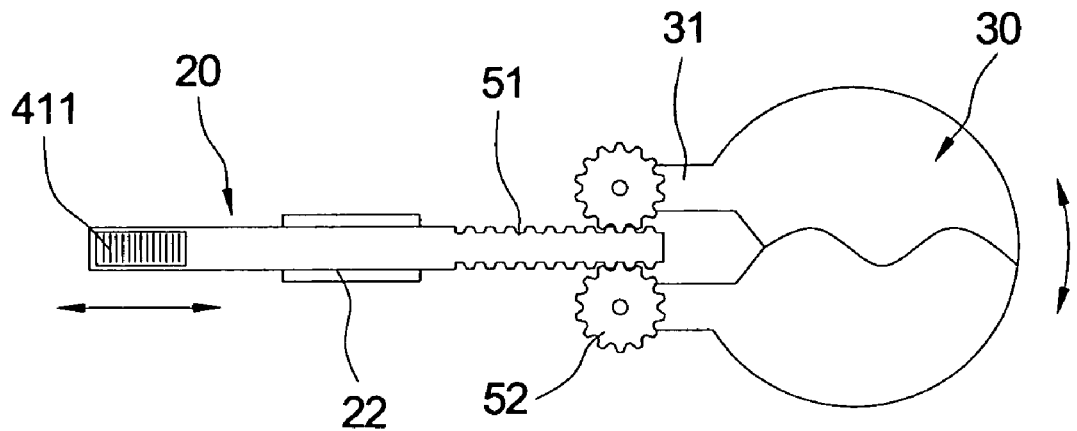
FIG. 4 is a side view showing how the lens cap module operates according to the first embodiment of the present invention.
Figure 5:
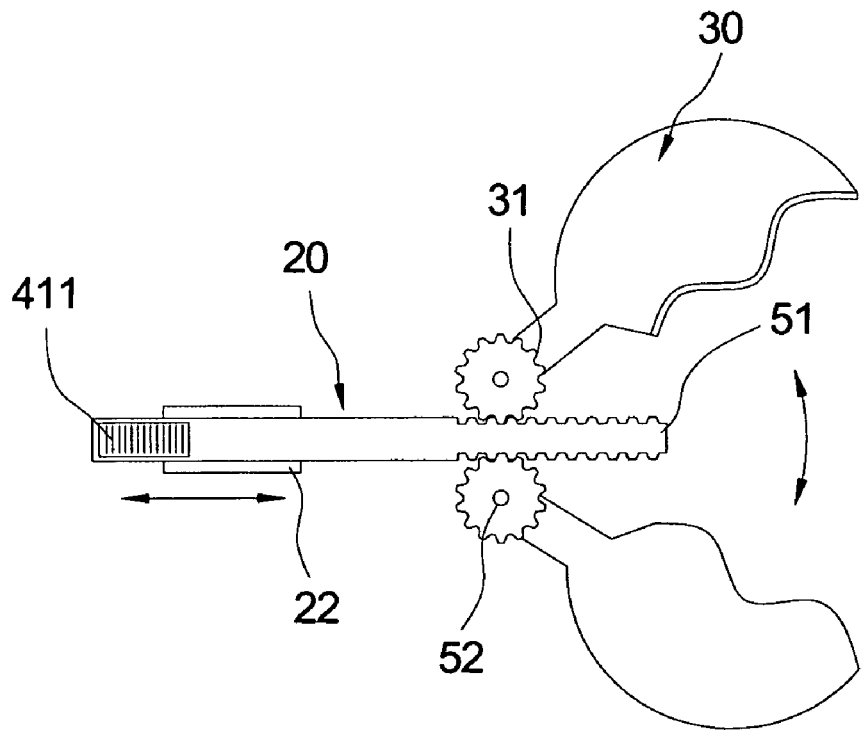
FIG. 5 is another side view showing how the lens cap module operates according to the first embodiment of the present invention.

Reference is made to FIGS. 4 and 5. The hand-push portion 411 of the switch 40 is manually pushed so that the rack 51 drives the two spur gears 52 of the two leaf pieces 30. In this light, how much do the two leaf pieces 30 rotate depend on the lengths of the two extension portions 31 of the two leaf pieces 30.

Figure 6:
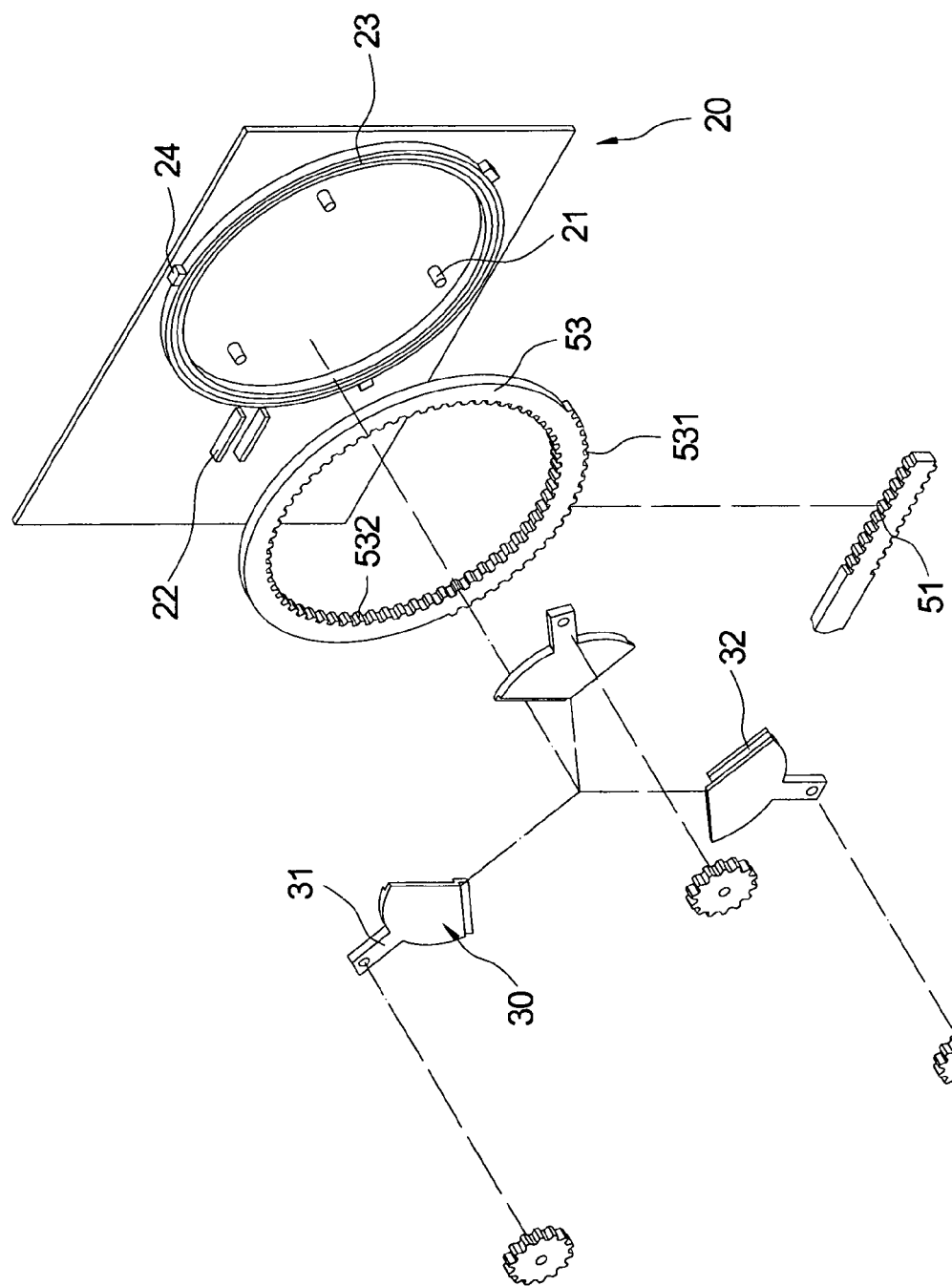
FIG. 6 is an exploded view of a lens cap module of the second embodiment of the present invention.
Figure 7:
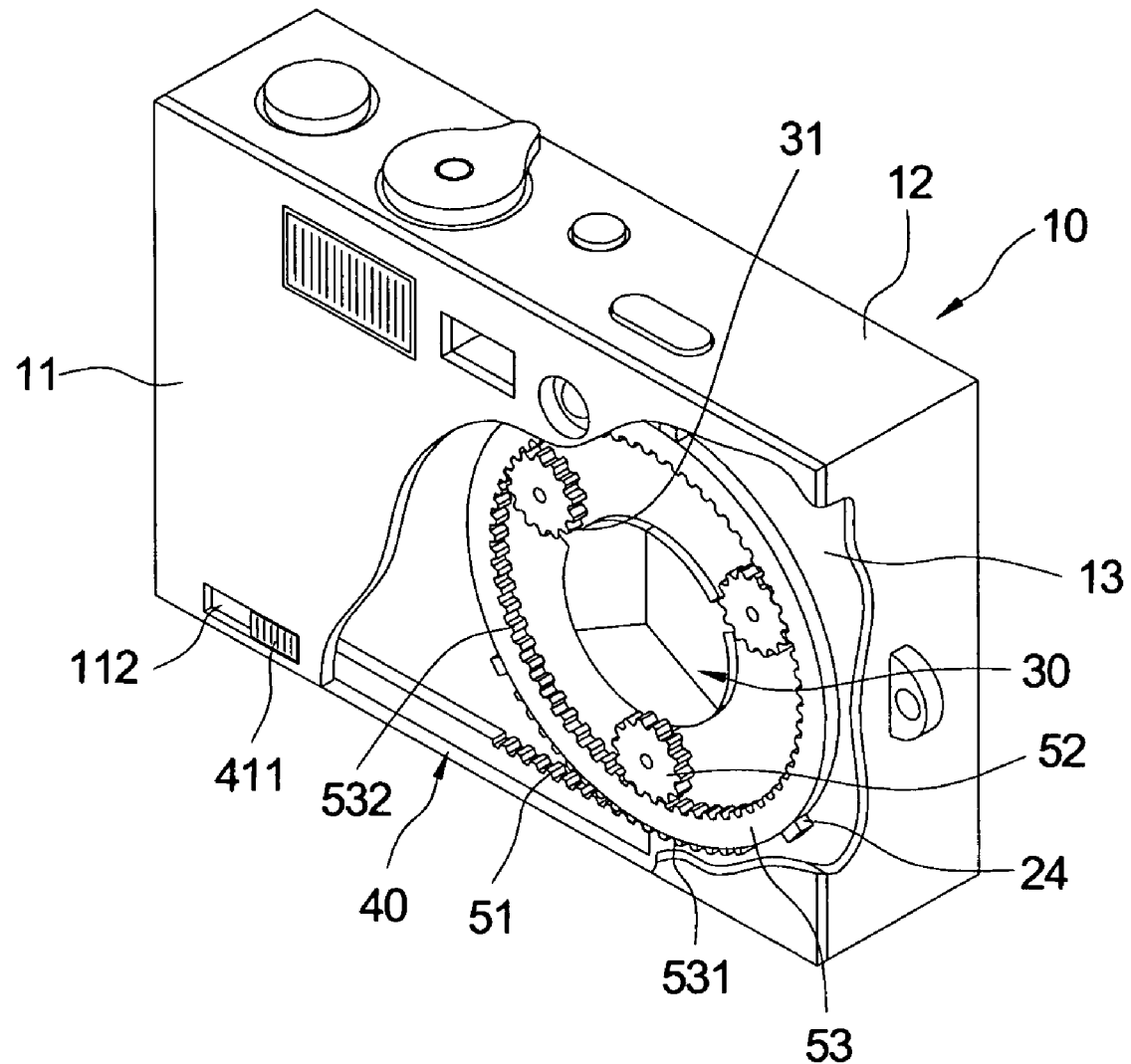
FIG. 7 is perspective view of a lens cap module operates according to the second embodiment of the present invention.

Reference is made to FIGS. 6 and 7. FIGS. 6 and 7 illustrate a lens cap module according to the second embodiment of the present invention. The holding stand 20 has three pins 21, a guide groove 23 and three guide blocks 24. Each of the leaf pieces 30 is substantially triangular-shaped. Each of three extensions 31 are integrally formed and extend from one end of each of the leaf pieces 30 respectively. In addition, each of the three extensions 31 is pivotally connected with each of the three holding pins 21 of the holding stand 20 so that each of the leaf pieces 30 is pivotally connected with the holding stand 20. Each of the other ends of the leaf pieces 30 is an engagement portion 32, and the leaf pieces 30 are separately connected to each other through the engagement portion 32.

The gear transmission 50 has a gear ring 53 slidably positioned at the guide rail 23 of the holding stand 20. An outer surface of the gear ring 53 slidably abuts at the three guide blocks 24 of the holding stand 20. The gear ring 53 has an outer rack 531 and an inner rack 532, and the outer rack 531 of the gear ring 53 corresponds with and engages with the rack 51 of the gear transmission 50. Besides, the inner rack 532 of the gear ring 53 engages with the spur gears 52 of the gear transmission 50.

Figure 8:
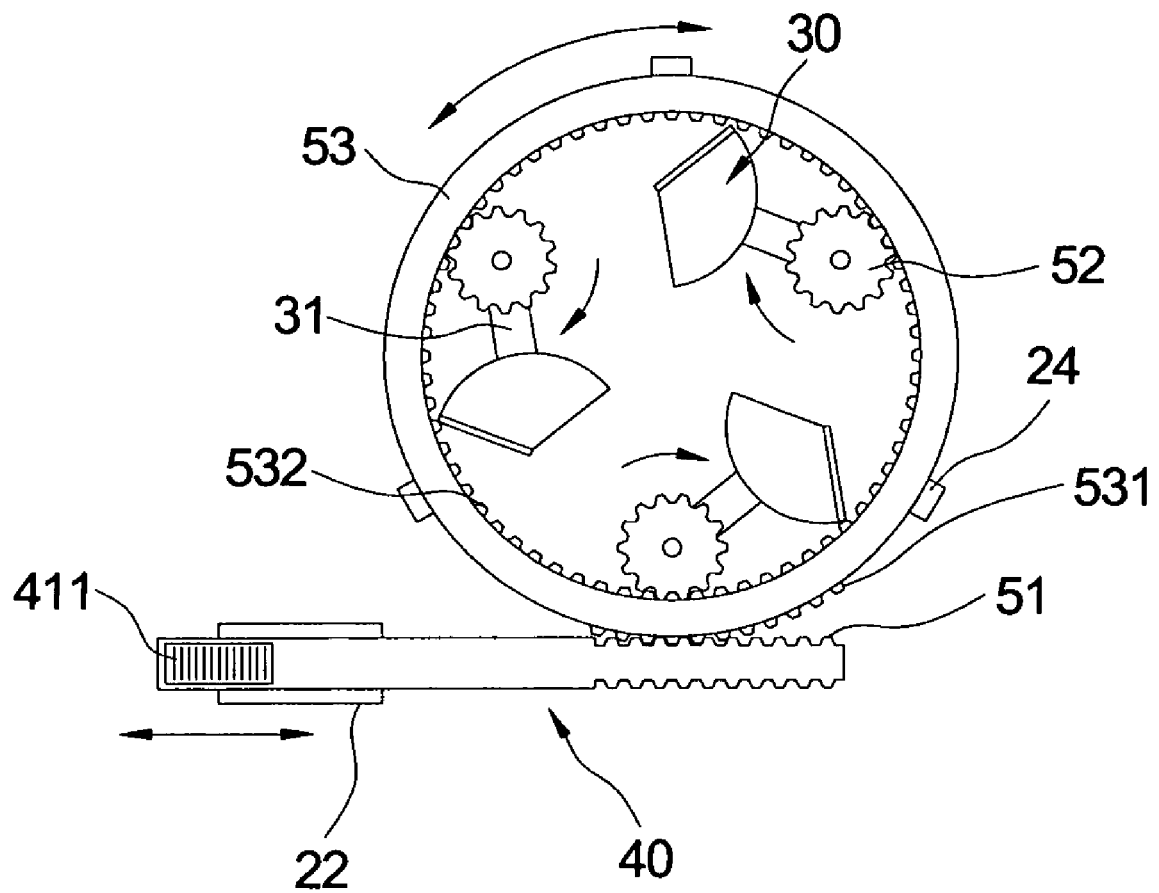
FIG. 8 is another side view showing how the lens cap module operates according to the second embodiment of the present invention.

Reference is made to FIG. 8. The hand-push portion 411 of the switch 40 is manually pushed so that the rack 51 of the gear transmission 50 drives the outer rack 531 of the gear ring 53. Then, the inner rack 532 of the gear ring 53 drives the spur gears 52 of the gear transmission 50 so that the leaf pieces 30 pivot and engage or disengage one another.

According to other embodiments of the present invention, the drive element 41 may be a resilient module, a hydraulic device or electro-activated device. The leaf pieces 30 may be arc-shaped, circular or polygonal.

The present invention is a lens cap module including a plurality of leaf pieces 30. It spends less time opening or closing the leaf pieces 30 because the leaf pieces 30 are not bulky and pivot around pins of the holding stand 20. In this light, restriction of design of the lens cap module is decreased and product development speeds up.

While the invention has been described with reference to the preferred embodiments, the description does not intend to be construed in a limiting sense. It is therefore contemplated that the appended claims will cover any such modifications or embodiments as may fall within the scope of the invention defined by the following claims and their equivalents.

What is claimed is:

1. A lens cap module positioned at a holding stand, comprising:
    a plurality of leaf pieces pivotally positioned at the holding stand and engaging or disengaging each other;
    a switch slidably positioned at the holding stand; and
    a gear transmission connecting between the leaf pieces and the switch;
    wherein a plurality of holding pins are positioned at a front surface of the holding stand, and extensions are integrally formed and extend from one end of each of the leaf pieces respectively, and each of the extensions is pivotally connected with one of the holding pins of the holding stand, an engagement portion is formed on other end of the leaf piece and the leaf pieces are separately connected to each other through the engagement portion.

2. The lens cap module as claimed in claim 1, wherein the front surface of the holding stand has a guide groove, and the switch is slidably positioned at the guide groove.

3. The lens cap module as claimed in claim 2, wherein the gear transmission includes a rack and a plurality of spur gears, and the rack is positioned at the switch and the spur gears are respectively firmly positioned at the leaf pieces so that the spur gears engage with the rack.

4. The lens cap module as claimed in claim 1, wherein the gear transmission includes a rack, a plurality of spur gears and a gear ring, and the rack is positioned at the switch and the spur gears are firmly positioned at the leaf pieces, and the gear ring is slidably positioned at the holding stand and has an outer rack on an outside thereof for engaging with the rack and an inner rack on an inside thereof for engaging with the spur gears.

5. The lens cap module as claimed in claim 4, wherein the holding stand has a guide groove and a plurality of guide blocks at the front surface thereof, and the gear ring is slidably positioned at the guide groove and the gear ring slidably abuts to the guide blocks on the outside thereof.

6. The lens cap module as claimed in claim 1, wherein the leaf pieces are arc-shaped, circular or polygonal.

7. The lens cap module as claimed in claim 1, wherein the switch has a drive element, which is a hand-push portion, a resilient module, a hydraulic device or electro-activated device.

8. A lens cap module positioned at a holding stand, comprising:
    a plurality of leaf pieces pivotally positioned at the holding stand and engaging or disengaging each other;
    a switch slidably positioned at the holding stand; and
    a gear transmission connecting between the leaf pieces and the switch;
    wherein the gear transmission includes a rack, a plurality of spur gears and a gear ring, and the rack is positioned at the switch and the spur gears are firmly positioned at the leaf pieces, and the gear ring is slidably positioned at the holding stand and has an outer rack on an outside thereof for engaging with the rack and an inner rack on an inside thereof for engaging with the spur gears; and
    the holding stand has a guide groove and a plurality of guide blocks at a front surface thereof, and the gear ring is slidably positioned at the guide groove and the gear ring slidably abuts to the guide blocks on the outside thereof.

* * * * *